(No Model.)

C. H. PRESTON.
NUT LOCK.

No. 279,182. Patented June 12, 1883.

Witnesses:
C. G. Brownell
A. Barthel

Inventor:
Charles H. Preston

UNITED STATES PATENT OFFICE.

CHARLES H. PRESTON, OF DETROIT, MICHIGAN.

NUT-LOCK.

SPECIFICATION forming part of Letters Patent No. 279,182, dated June 12, 1883.

Application filed December 26, 1882. (No model.)

*To all whom it may concern:*

Be it known that I, CHARLES H. PRESTON, of Detroit, county of Wayne, and State of Michigan, have invented an Improvement in Nut-Locks, of which the following is a specification.

The object of my improvement is to provide a simple and efficient device for preventing bolt-nuts subjected to constant vibration or jarring from becoming loose; and my invention consists in the construction and application of a locking-sleeve, which, in combination with a peculiarly-constructed nut, attains the desired object.

Figure 1:
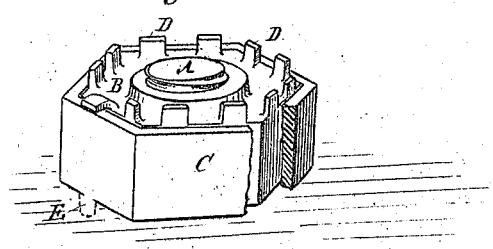
Figure 2:
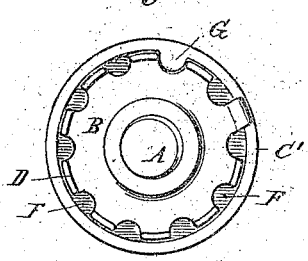
Figure 3:
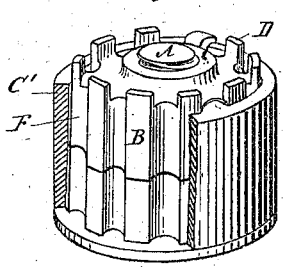
Figure 4:
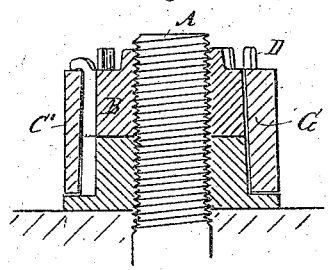
Figure 5:
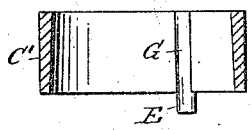

In the drawings which form a part of this specification, Figure 1 is a perspective view of a hexagonal nut locked in place by the locking-sleeve. Fig. 2 is a plan view of a circular nut with circular locking-sleeve. Fig. 3 is a perspective view, showing my nut-lock applied to the lock-nut of a jam-nut. Fig. 4 is a vertical central section of Fig. 3. Fig. 5 is a vertical section of the locking-sleeve used in Fig. 2.

In the drawings, A is the bolt, upon which the nut B is screwed in the usual manner. C is a locking-sleeve, which is slipped over the nut B. The nut B is of usual construction, except that it is provided on its top face, and around its outer edge thereof, with a number of lugs, D, cast integral with the nut. The sleeve C is provided upon its lower edge with a lug, E.

In practice, after the nut B is screwed to place, a small hole is drilled into the bed upon which the nut rests, for the reception of the lug E, after which the sleeve C is slipped over the nut, with its lug E entering the hole drilled for it into the bed; and to hold the sleeve C now firmly in position one or more of the lugs D are hammered over the top edge of the sleeve. To allow this to be done the nut B is to be made of malleable iron. To unlock the nut all there is to be done is to free the sleeve C from the bend over lug D, which may be simply broken off, as there are a sufficient number of such lugs provided to allow of a repeated locking. My locking device is, however, peculiarly adapted to round nuts, as the position of the hole for the reception of the lug E can then easily be determined and drilled before the nut is secured to place. I construct the nut then as shown in Fig. 2, where F are a number of splineways cut into the periphery of the nut at equal distances apart. The sleeve is then provided upon its inner face with a spline, G, of proper size to fit any of the like splineways. The lug E may then be a continuation of the spline, as shown in Fig. 5. A round nut constructed with these splineways can easily be screwed to place by a wrench made to fit its outer shape.

In Fig. 3 I have shown my locking device as applied to secure the lock-nut of a jam-nut in place. If the nuts are made round, then both have to be provided with corresponding splineways, and the sleeve extends the whole height of both nuts, and the lug E upon the under side may be omitted or broken away, as it is here of no particular value, as the object is simply to lock the upper nut upon the lower. With hexagonal or other polygonal nuts no splineways are needed, and the top nut is like the one shown in Fig. 1, while the lower nut may be an ordinary nut.

As will be seen, the spirit of my invention is a locking-sleeve adapted to interlock the nut with the bed, or, as in the case of jam-nuts, to interlock the top nut with the lower nut, in combination with the lugs E, adapted to secure the locking-sleeve in place.

What I claim as my invention is—

1. As a new article of manufacture, a lock-nut consisting of a malleable-iron nut provided on top with a number of lugs, and a locking-sleeve fitting over the nut and provided upon its lower face with a projecting lug, substantially as and for the purpose described.

2. A malleable-iron nut provided upon its top face, near the outer edge thereof, with a number of lugs adapted to hold a locking-sleeve in position, substantially as described.

3. A round nut provided upon its cylindrical face with a number of splineways at equal distances apart, and on top, and near the outer edge thereof, with a number of lugs, in combination with a locking-sleeve provided upon its inner face with a spline, substantially as and for the purpose described.

CHARLES H. PRESTON.

Witnesses:
C. G. BROWNELL,
A. BARTHEL.